United States Patent
Kim et al.

(10) Patent No.: US 10,909,932 B2
(45) Date of Patent: Feb. 2, 2021

(54) DISPLAY APPARATUS AND METHOD OF DRIVING DISPLAY PANEL USING THE SAME

(71) Applicant: SAMSUNG DISPLAY CO., LTD., Yongin-si (KR)

(72) Inventors: Kyunho Kim, Hwaseong-si (KR); Juhyun Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/577,417

(22) Filed: Sep. 20, 2019

(65) Prior Publication Data

US 2020/0152133 A1    May 14, 2020

(30) Foreign Application Priority Data

Nov. 12, 2018 (KR) .................. 10-2018-0138016

(51) Int. Cl.
G09G 3/3275 (2016.01)
G06F 3/038 (2013.01)

(52) U.S. Cl.
CPC .......... G09G 3/3275 (2013.01); G06F 3/038 (2013.01); *G09G 2310/06* (2013.01); *G09G 2320/0247* (2013.01); *G09G 2330/028* (2013.01)

(58) Field of Classification Search
CPC ............. G09G 3/3275; G09G 2310/06; G09G 2320/0247; G09G 2330/028; G09G 3/32; G09G 3/3208; G09G 2340/16; G09G 2320/0252; G09G 2360/16; G09G 3/3291; G09G 3/3258; G09G 2320/0271; G09G 2320/0276; G06F 3/038; G06F 3/14

See application file for complete search history.

(56) References Cited

U.S. PATENT DOCUMENTS

2012/0069059 A1*  3/2012  Lee ................. G09G 3/3225
                                                345/690
2018/0061322 A1*  3/2018  Yim ................. G09G 3/20

FOREIGN PATENT DOCUMENTS

| KR | 10-0889690 | 3/2009 |
| KR | 10-1040798 | 6/2011 |
| KR | 10-1064462 | 9/2011 |
| KR | 10-1101094 | 1/2012 |

* cited by examiner

*Primary Examiner* — Abhishek Sarma
(74) *Attorney, Agent, or Firm* — F. Chau & Associates, LLC

(57) ABSTRACT

A display apparatus includes: a display panel configured to display an image based on input image data; a gate driver configured to output a gate signal to the display panel; a data driver configured to output a data voltage to the display panel; and a power voltage generator configured to generate a power voltage and output the power voltage to cause an image to display on the display panel. The power voltage has a response speed that varies according to the input image data.

19 Claims, 7 Drawing Sheets

FIG. 8

| RISING | ELVDD TRANSIENT RESPONSE TIME |
|---|---|
| 0 → 25% | 20ms |
| 0 → 50% | 30ms |
| 0 → 75% | 40ms |
| 0 → 100% | 50ms |

DISPLAY APPARATUS AND METHOD OF DRIVING DISPLAY PANEL USING THE SAME

CROSS-REFERENCE TO RELATED APPLICATION

This application claims priority under 35 U.S.C. § 119 to Korean Patent Application No. 10-2018-0138016, filed on Nov. 12, 2018 in the Korean Intellectual Property Office (KIPO), the disclosure of which is incorporated by reference herein in its entirety.

TECHNICAL FIELD

Exemplary embodiments of the present inventive concept relate to a display apparatus and a method of driving a display panel using the display apparatus. More particularly, exemplary embodiments of the present inventive concept relate to a display apparatus using a power voltage having a response speed based on input image data and a method of driving the display panel using the display apparatus.

DISCUSSION OF THE RELATED ART

A display apparatus typically includes a display panel and a display panel driver. For example, a typical display panel includes a plurality of gate lines, a plurality of data lines crossing the plurality of gates lines, and a plurality of pixels connected to the gate lines and data lines. The display panel driver includes a gate driver connected to the plurality of gate lines, a data driver connected to the plurality of data lines, and a power voltage generator connected to the plurality of pixels. The gate driver outputs gate signals to the gate lines. The data driver outputs data voltages to the data lines. The power voltage generator outputs a power voltage to the pixels.

When the display panel displays a high grayscale pattern such as a full white pattern, a peak current to drive the display panel may increase over a threshold level and the display apparatus may not operate normally. Thus, when the peak current increases over the threshold level, the input image data may be decreased to decrease the peak current.

However, an operation timing to decrease the input image data may not coincide with a decreasing timing of the power voltage applied to the display panel, and image flickering may occur.

SUMMARY

According to an exemplary embodiment of the present inventive concept, a display apparatus, includes: a display panel configured to display an image based on input image data; a gate driver configured to output a gate signal to the display panel; a data driver configured to output a data voltage to the display panel; and a power voltage generator configured to generate a power voltage and output the power voltage to cause an image to display on the display panel. The power voltage has a response speed that varies according to the input image data.

In an exemplary embodiment of the present inventive concept, the power voltage has a first response speed when a luminance of a present frame of the input image data is equal to or less than a luminance of a previous frame of the input image data. The power voltage has a second response speed when the luminance of the present frame of the input image data is greater than the luminance of the previous frame of the input image data. The second response speed is different from the first response speed.

In an exemplary embodiment of the present inventive concept, the second response speed is slower than the first response speed.

In an exemplary embodiment of the present inventive concept, the luminance of the present frame of the input image data is determined as a total sum of grayscale data of the present frame of the input image data corresponding to an entire area of the display panel. The luminance of the previous frame of the input image data is determined as a total sum of grayscale data of the previous frame of the input image data corresponding to the entire area of the display panel.

In an exemplary embodiment of the present inventive concept, display apparatus further includes: a data analyzer configured to analyze the input image data, determine whether the luminance of the present frame of the input image data is greater than the luminance of the previous frame of the input image data and generate a selecting signal representing whether the luminance of the present frame of the input image data is greater than the luminance of the previous frame of the input image data; and a time constant selector configured to determine a time constant of the power voltage in response to the selecting signal.

In an exemplary embodiment of the present inventive concept, display apparatus further includes a driving controller configured to control an operation the gate driver and an operation of the data driver. The driving controller includes the data analyzer and the time constant selector.

In an exemplary embodiment of the present inventive concept, the power voltage generator includes the data analyzer and the time constant selector.

In an exemplary embodiment of the present inventive concept, the time constant selector includes: a first switch configured to receive the selecting signal from the data analyzer; a first time constant circuit connected to the first switch; a second switch configured to receive the selecting signal from the data analyzer; and a second time constant circuit connected to the second switch.

In an exemplary embodiment of the present inventive concept, the first time constant circuit includes a first resistor connected to the first switch and a first capacitor connected to the first resistor in parallel. The second time constant circuit includes a second resistor connected to the second switch and a second capacitor connected to the second resistor in parallel.

In an exemplary embodiment of the present inventive concept, the first switch is turned on and the power voltage generator is connected to the first time constant circuit through the first switch when the luminance of the present frame of the input image data is equal to or less than the luminance of the previous frame of the input image data. The second switch is turned on and the power voltage generator is connected to the second time constant circuit through the second switch when the luminance of the present frame of the input image data is greater than the luminance of the previous frame of the input image data. A multiplication of a resistance of the second resistor and a capacitance of the second capacitor is greater than a multiplication of a resistance of the first resistor and a capacitance of the first capacitor.

In an exemplary embodiment of the present inventive concept, the time constant selector includes: a first switch configured to receive the selecting signal from the data analyzer; a first time constant circuit connected to the first switch; a second switch configured to receive the selecting signal from the data analyzer; a second time constant circuit connected to the second switch; a third switch configured to receive the selecting signal from the data analyzer; and a third time constant circuit connected to the third switch.

In an exemplary embodiment of the present inventive concept, the first switch is turned on and the power voltage generator is connected to the first time constant circuit through the first switch when the luminance of the present frame of the input image data is equal to or less than the luminance of the previous frame of the input image data. The second switch is turned on and the power voltage generator is connected to the second time constant circuit through the second switch when the luminance of the present frame of the input image data is greater than the luminance of the previous frame of the input image data and when a difference between the luminance of the present frame of the input image data and the luminance of the previous frame of the input image data is equal to or less than a threshold value. The third switch is turned on and the power voltage generator is connected to the third time constant circuit through the third switch when the luminance of the present frame of the input image data is greater than the luminance of the previous frame of the input image data and when the difference between the luminance of the present frame of the input image data and the luminance of the previous frame of the input image data is greater than the threshold value.

In an exemplary embodiment of the present inventive concept, the display panel includes an organic light emitting diode. The power voltage is output to the organic light emitting diode.

According to an exemplary embodiment of the present inventive concept, a method of driving a display panel includes: outputting a gate signal to the display panel; outputting a data voltage corresponding to input image data to the display panel; generating a power voltage having a response speed that varies according to the input image data; and outputting the power voltage to a pixel of the display panel.

In an exemplary embodiment of the present inventive concept, the power voltage has a first response speed when a luminance of a present frame of the input image data is equal to or less than a luminance of a previous frame of the input image data. The power voltage has a second response speed when the luminance of the present frame of the input image data is greater than the luminance of the previous frame of the input image data. The second response speed is different from the first response speed.

In an exemplary embodiment of the present inventive concept, the second response speed is slower than the first response speed.

In an exemplary embodiment of the present inventive concept, the luminance of the present frame of the input image data is determined as a total sum of grayscale data of the present frame of the input image data corresponding to an entire area of the display panel. The luminance of the previous frame of the input image data is determined as a total sum of grayscale data of the previous frame of the input image data corresponding to the entire area of the display panel.

In an exemplary embodiment of the present inventive concept, the method further includes: analyzing the input image data, determining whether the luminance of the present frame of the input image data is greater than the luminance of the previous frame of the input image data and generating a selecting signal representing whether the luminance of the present frame of the input image data is greater than the luminance of the previous frame of the input image data, using a data analyzer; and determining a time constant of the power voltage in response to the selecting signal, using a time constant selector.

In an exemplary embodiment of the present inventive concept, the time constant selector includes: a first switch configured to receive the selecting signal from the data analyzer; a first time constant circuit connected to the first switch; a second switch configured to receive the selecting signal from the data analyzer; and a second time constant circuit connected to the second switch.

In an exemplary embodiment of the present inventive concept, the first time constant circuit includes a first resistor connected to the first switch and a first capacitor connected to the first resistor in parallel. The second time constant circuit includes a second resistor connected to the second switch and a second capacitor connected to the second resistor in parallel.

BRIEF DESCRIPTION OF THE DRAWINGS

The above and other features of the present inventive concept will become more apparent by describing in detailed exemplary embodiments thereof with reference to the accompanying drawings, in which:

FIG. 8 is a table illustrating an operation of the time constant selector of FIG. 7.

DETAILED DESCRIPTION OF THE EMBODIMENTS

Hereinafter, exemplary embodiments of the present inventive concept will be explained in detail with reference to the accompanying drawings.

Figure 1:
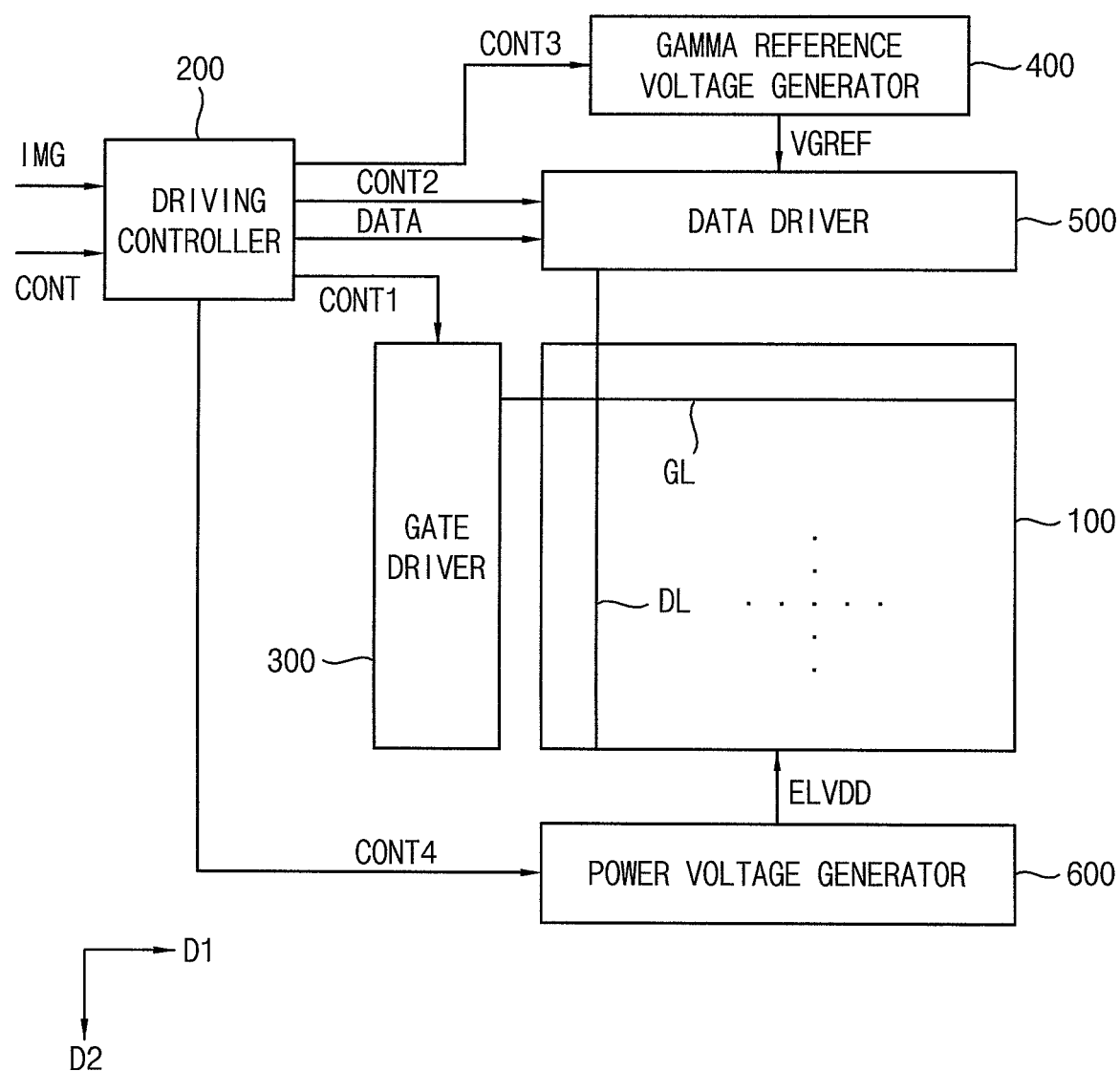
FIG. 1 is a block diagram illustrating a display apparatus according to an exemplary embodiment of the present inventive concept.

FIG. 1 is a block diagram illustrating a display apparatus according to an exemplary embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and a power voltage generator 600.

For example, the driving controller 200 and the data driver 500 may be integrally formed. For example, the driving controller 200, the gamma reference voltage generator 400 and the data driver 500 may be integrally formed. For example, the driving controller 200, the gate driver 300, the gamma reference voltage generator 400 and the data driver 500 may be integrally formed.

The display panel 100 includes a display region and a peripheral region adjacent to the display region. For example, the peripheral region may at least partially surround the display region.

For example, the display panel 100 may be an organic light emitting diode display panel including an organic light emitting diode. However, the present inventive concept is not limited thereto. For example, the display panel 100 may be a liquid crystal display.

The display panel 100 includes a plurality of gate lines GL, a plurality of data lines DL and a plurality of pixels electrically connected to the gate lines GL and the data lines DL. The gate lines GL extend in a first direction D1 and the data lines D1, extend in a second direction D2 crossing the first direction D1.

The driving controller 200 receives input image data IMG and an input control signal CONT from an external apparatus. The input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the power voltage generator 600 based on the input image data IMG and/or the input control signal CONT, and outputs the fourth control signal CONT4 to the power voltage generator 600.

In response to the first control signal CONT1 generated from the driving controller 200, the gate driver 300 generates gate signals driving the gate lines GL. The gate driver 300 outputs the gate signals to the gate lines GL. For example, the gate driver 300 may sequentially output the gate signals to the gate lines GL. For example, the gate lines GL may include a writing gate line to transmit a writing gate signal to the pixel. In addition, the gate lines GL may include an initializing gate line to transmit an initializing gate signal to the pixel.

In response to the third control signal CONT3 generated from the driving controller 200, the gamma reference voltage generator 400 generates a gamma reference voltage VGREF. The gamma reference voltage generator 400 provides the gamma reference voltage VGREF to the data driver 500. The gamma reference voltage VGREF has a value corresponding to a predetermined voltage level of the data signal DATA.

In an exemplary embodiment of the present inventive concept, the gamma reference voltage generator 400 may be disposed in the driving controller 200, or in the data driver 500.

The data driver 500 receives the second control signal CONT2 and the data signal DATA from the driving controller 200. In addition, the data driver 500 receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may generate a power voltage to drive the display apparatus. For example, the power voltage generator 600 may generate a gate power voltage to drive the gate driver 300. For example, the power voltage generator 600 may generate a data power voltage to drive the data driver 500. For example, the power voltage generator 600 may generate a common voltage that is applied to the display panel 100. For example, the power voltage generator 600 may generate a power voltage that is output to an organic light emitting diode of the display panel 100. For example, the power voltage generator 600 may generate a high power voltage ELVDD that is output to the organic light emitting diode of the display panel 100. For example, the power voltage generator 600 may generate a low power voltage ELVSS in FIG. 2 to the organic light emitting diode of the display panel 100.

Figure 2:
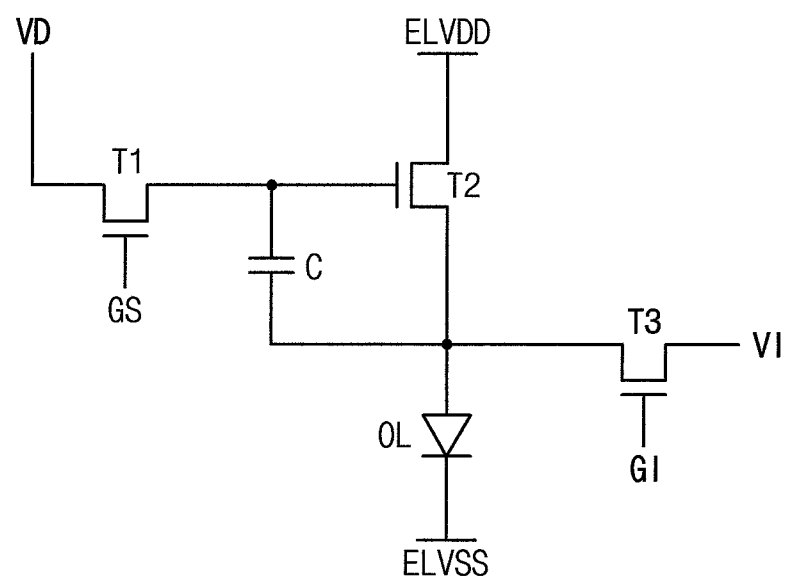
FIG. 2 is a circuit diagram illustrating a pixel of a display panel of FIG. 1.

FIG. 2 is a circuit diagram illustrating a pixel of the display panel 100 of FIG. 1.

Referring to FIGS. 1 and 2, the display panel 100 may include a plurality of pixels disposed in a matrix form. The pixel may include an organic light emitting diode OL. Light emitted by the organic light emitting diode OL is adjusted based on the data voltage VD.

For example, the pixel may include a first switching element T1, a second switching element T2, a third switching element T3, a capacitor C and the organic light emitting diode OL.

The first switching element T1 may include a gate electrode to which the writing gate signal GS is applied, a source electrode to which the data voltage VD is applied and a drain electrode connected to a gate electrode of the second switching element 1T2. For example, the data voltage VD may be transferred from the first switching element T1 to the capacitor C and the second switching element T2 in response to the received writing gate signal GS.

The second switching element T2 may include a gate electrode connected to the drain electrode of the first switching element T1, a source electrode to which the high power voltage ELVDD is applied and a drain electrode connected to an anode electrode of the light emitting diode OL. For example, the high power voltage ELVDD may be transferred from the second switching element T2 to the anode electrode of the light emitting diode OL in response to the data voltage VD received by the gate electrode of the second switching element T2.

The third switching element T3 may include a gate electrode to which the initializing gate signal GI is applied, a source electrode to which an initializing voltage VI is applied and a drain electrode connected to the anode electrode of the organic light emitting diode OL.

The capacitor C may include a first electrode connected to the gate electrode of the second switching element T2 and a second electrode connected to the drain electrode of the second switching element T2.

The organic light emitting diode OL may include the anode electrode connected to the drain electrode of the second switching element T2 and a cathode electrode to which the low power voltage ELVSS is applied.

The power voltage generator 600 may generate the high power voltage ELVDD having a response speed that varies according to the input image data IMG and output the high power voltage ELVDD to the pixel.

The present inventive concept is not limited to the pixel circuit of FIG. 2. The present inventive concept may be applied to other pixel circuits to which the high power voltage ELVDD is applied.

Figure 3:
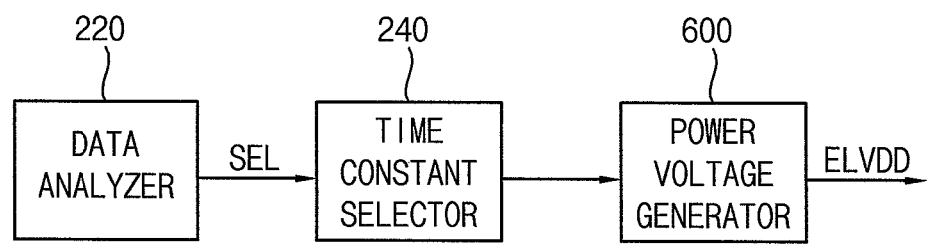
FIG. 3 is a block diagram illustrating a driving controller and a power voltage generator of FIG. 1.
Figure 4:
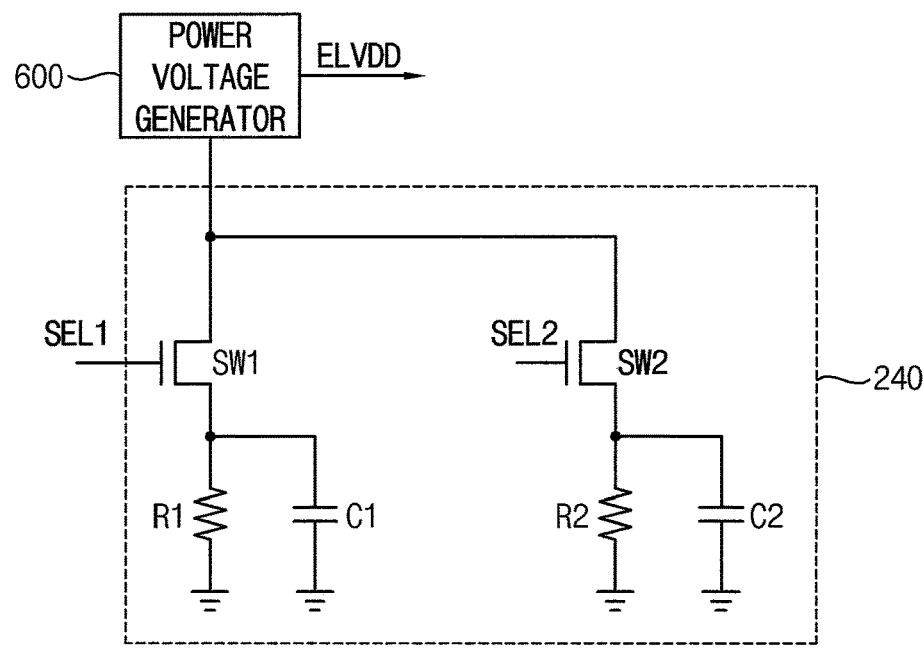
FIG. 4 is a circuit diagram illustrating a time constant selector of FIG. 3.

FIG. 3 is a block diagram illustrating the driving controller 200 and the power voltage generator 600 of FIG. 1. FIG. 4 is a circuit diagram illustrating a time constant selector 240 of FIG. 3.

Referring to FIGS. 1 to 4, the power voltage generator 600 may generate the power voltage ELVDD having a response speed varied according to the input image data IMG. When a luminance of a present frame of the input image data IMG is equal to or less than a luminance of a previous frame of the input image data IMG, the power voltage ELVDD may have a first response speed. When the luminance of the present frame of the input image data IMG is greater than the luminance of the previous frame of the input image data IMG, the power voltage ELVDD may have a second response speed different from the first response speed. The second response speed may be slower than the first response speed.

In the present exemplary embodiment, the driving controller 200 may include a data analyzer 220 and a time constant selector 240.

The data analyzer 220 analyzes the input image data IMG. The data analyzer 220 may determine whether the luminance of the present frame of the input image data IMG is greater than the luminance of the previous frame of the input image data IMG. The data analyzer 220 may generate a selecting signal SEL representing that the luminance of the present frame of the input image data IMG is greater than the luminance of the previous frame of the input image data IMG.

The data analyzer 220 may determine the luminance of the present frame of the input image data IMG as a total sum of grayscale data of the present frame of the input image data IMG corresponding to an entire area of the display panel 100.

The data analyzer 220 may determine the luminance of the previous frame of the input image data IMG as a total sum of grayscale data of the previous frame of the input image data IMG corresponding to an entire area of the display panel 100.

For example, the data analyzer 220 may be physically implemented by electronic circuits (or optical circuits) such as logic circuits, discrete components, microprocessors, hard-wired circuits, memory elements, wiring connections, and the like, which may be formed using semiconductor-based fabrication techniques or other manufacturing technologies. The data analyzer 220 may be programmed using software (e.g., microcode) to perform various functions discussed herein and may optionally be driven by firmware and/or software. In addition, the data analyzer 220 may be implemented by dedicated hardware, or as a combination of dedicated hardware to perform some functions and a processor (e.g., one or more programmed microprocessors and associated circuitry) to perform other functions.

The time constant selector 240 may determine the time constant of the power voltage ELVDD in response to the selecting signal SEL.

In the present exemplary embodiment, the time constant selector 240 may include two time constant circuits. For example, the time constant selector 240 may include a first switch SW1, a first time constant circuit connected to the first switch SW1, a second switch SW2 and a second time constant circuit connected to the second switch SW2.

For example, a first selecting signal SEL1 may be applied to the first switch SW1 and a second selecting signal SEL2 may be applied to the second switch SW2.

For example, when the luminance of the present frame of the input image data IMG is equal to or less than the luminance of the previous frame of the input image data IMG, the data analyzer 220 may activate and output the first selecting signal SEL and deactivate the second selecting signal SEL2. Thus, when the luminance of the present frame of the input image data IMG is equal to or less than the luminance of the previous frame of the input image data IMG, the first switch SW1 is turned on so that the power voltage generator 600 is connected to the first time constant circuit through the first switch SW1 and the power voltage ELVDD may have the first response speed. When the first switch SW1 is turned on, the second switch SW2 may be turned off.

For example, when the luminance of the present frame of the input image data IMG is greater than the luminance of the previous frame of the input image data IMG, the data analyzer 220 may activate the second selecting signal SEL2 and deactivate the first selecting signal SEL1. Thus, when the luminance of the present frame of the input image data IMG is greater than the luminance of the previous frame of the input image data IMG, the second switch SW2 is turned on so that the power voltage generator 600 is connected to the second time constant circuit and the power voltage ELVDD through the second switch SW2 may have the second response speed. When the second switch SW2 is turned on, the first switch SW1 may be turned off.

For example, the first time constant circuit may include a first resistor R1 connected to the first switch SW1 and a first capacitor C1 connected to the first resistor R1 in parallel.

For example, the second time constant circuit may include a second resistor R2 connected to the second switch SW2 and a second capacitor C2 connected to the second resistor R2 in parallel.

The time constant of the first time constant circuit may be determined as a multiplication of a resistance of the first resistor R1 and a capacitance of the first capacitor C1. The time constant of the second time constant circuit may be determined as a multiplication of a resistance of the second resistor R2 and a capacitance of the second capacitor C2.

The time constant of the second time constant circuit may be greater than the time constant of the first time constant circuit. Thus, when the power voltage generator 600 is connected to the second time constant circuit through the second switch SW2, the response speed of the power voltage ELVDD may get slower. When the power voltage generator 600 is connected to the first time constant circuit through the first switch SW1, the response speed of the power voltage ELVDD may get faster. For example, the first response speed may be faster than the second response speed.

Figure 5A:
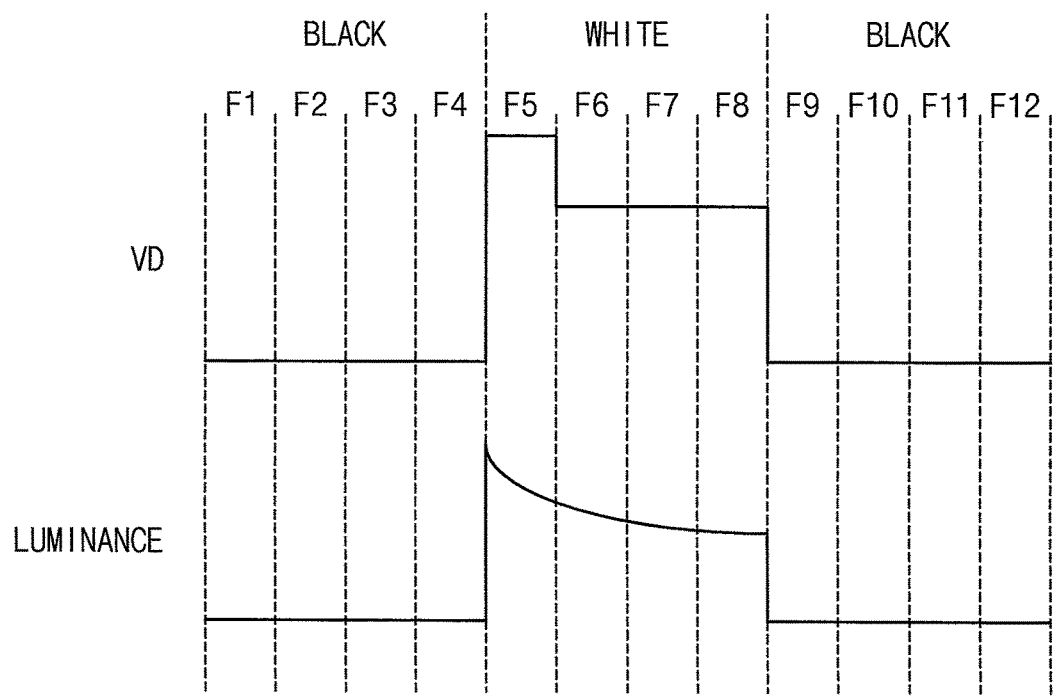
FIG. 5A is a graph illustrating a luminance of an image when the power voltage generator of FIG. 1 sets a response speed of a power voltage to be high regardless of increase and decrease of the luminance.
Figure 5B:
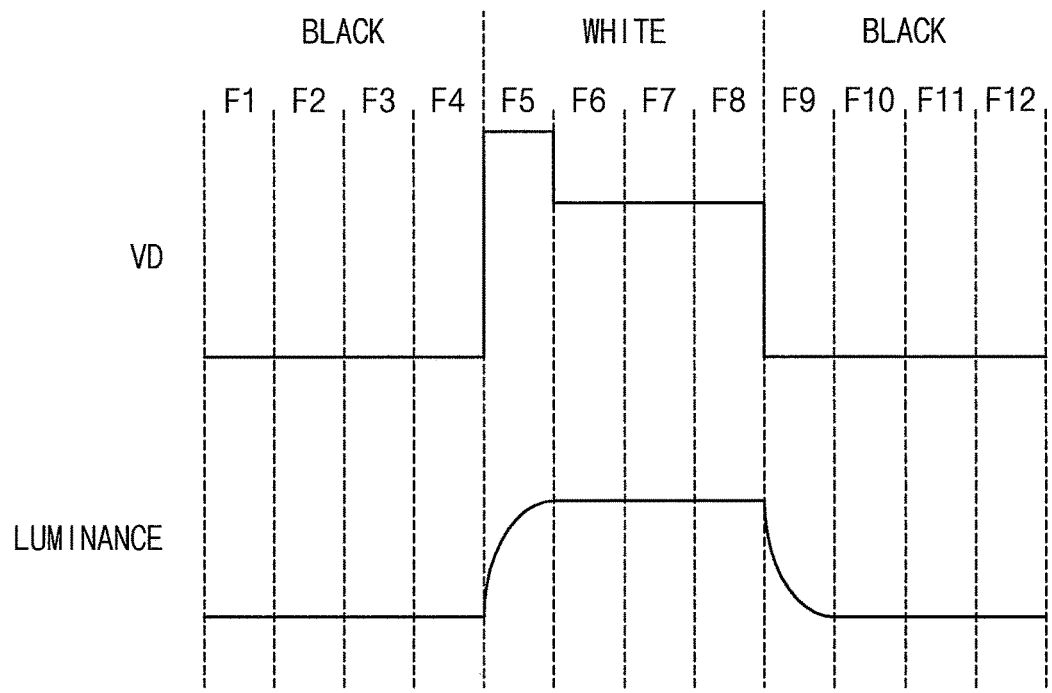
FIG. 5B is a graph illustrating the luminance of the image when the power voltage generator of FIG. 1 sets the response speed of the power voltage to be low regardless of increase and decrease of the luminance.
Figure 5C:
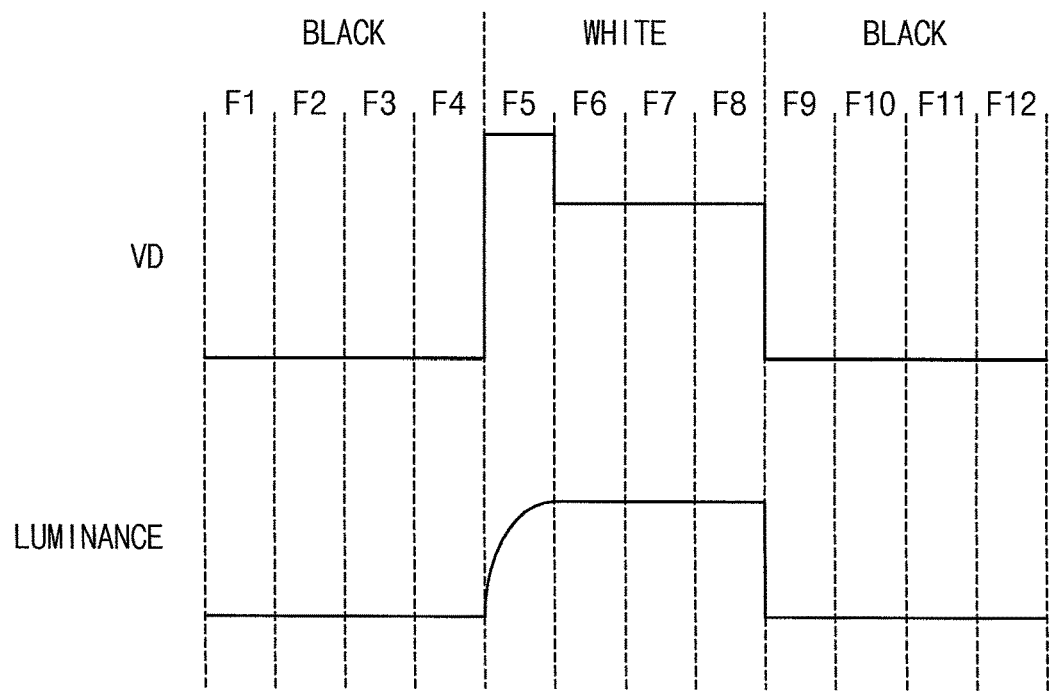
FIG. 5C is a graph illustrating the luminance of the image when the power voltage generator of FIG. 1 sets the response speed of the power voltage to be varied according to increase and decrease of the luminance.

FIG. 5A is a graph illustrating a luminance of an image when the power voltage generator of FIG. 1 sets a response speed of the power voltage ELVDD to be high regardless of increase and decrease of the luminance. FIG. 5B is a graph illustrating the luminance of the image when the power voltage generator of FIG. 1 sets the response speed of the power voltage ELVDD to be low regardless of increase and decrease of the luminance. FIG. 5C is a graph illustrating the luminance of the image when the power voltage generator of FIG. 1 sets the response speed of the power voltage ELVDD to vary according to increase and decrease of the luminance.

Referring to FIGS. 1 to 5C, when the image of the input image data IMG changes from a low grayscale image to a high grayscale image, the driving controller 200 may operate net power control operation such that a peak current of a driving current of the display panel 100 does not rapidly increase.

When the driving controller 200 determines that the image of the input image data IMG changes from the low grayscale image to the high grayscale image, the driving controller 200 may decrease a level of the input image data IMG. For example, when 1% area of the display panel 100 represents the maximum grayscale and the other area of the display panel 100 represents the minimum grayscale, the 1% area of the display panel 100, representing the maximum grayscale, may represent a first luminance by a first voltage. When 100% area of the display panel 100 represents the maximum grayscale, the 100% area of the display panel 100 may represent a second luminance, less than the first luminance, by a second voltage less than the first voltage.

The driving controller 200 may operate the net power control operation based on the present frame data of the input image data IMG. When the image is changed from the low grayscale image (e.g. BLACK in FIG. 5A) to the high grayscale image (e.g. WHTE in FIG. 5A) and the net power control operation is not fast enough to, for example, coincide with the operation timing of the input image data IMG, the display panel 100 may represent a higher luminance in an initial frame of the high grayscale image than other frames because the net power control operation is not applied immediately.

In FIG. 5A, the response speed of the power voltage ELVDD may be set to be fast regardless of increase and decrease of the luminance. In FIG. 5A, the input image data IMG represents the low grayscale image BLACK in first to fourth frames F1 to F4, the high grayscale image WHITE in fifth to eighth frames F5 to F8 and the low grayscale image BLACK in ninth to thirteenth frames F9 to F12.

When the net power control operation is not fast enough, the fifth frame F5 may represent a first data voltage to which the net power control is not applied. Thus, the display panel 100 may display the highly boosted luminance in an initial portion of the fifth frame F5.

In contrast, the net power control is applied to the sixth to eighth frames F6 to F8 so that the sixth to eighth frames F6 to F8 may represent a second data voltage less than the first data voltage corresponding to the high grayscale image WHITE. Thus, the luminance of the display panel 100 may be substantially stabilized in the sixth to eighth frames F6 to F8. For example, the slope of the luminance may be substantially linear.

For example, the highly boosted luminance in the fifth frame F5 may be shown to a user as a flash. When the low grayscale image BLACK and the high grayscale image WHITE are repetitive, the highly boosted luminance may be shown to a user as a repetitive flicker.

In FIG. 5B, the response speed of the power voltage ELVDD may be set to be slow regardless of increase and decrease of the luminance. In FIG. 5B, the input image data IMG represents the low grayscale image BLACK in first to fourth frames F1 to F4, the high grayscale image WHITE in fifth to eighth frames F5 to F8 and the low grayscale image BLACK in ninth to thirteenth frames F9 to F12.

When the net power control operation is not fast enough, the fifth frame F5 may represent a first data voltage to which the net power control operation is not applied. However, the response speed of the power voltage ELVDD is set to be slow in FIG. 5B so that the luminance of the display panel 100 does not boost highly in the initial portion of the fifth frame F5.

Since the response speed of the power voltage ELVDD is set to be slow, the luminance is slowly decreased in an initial portion of the ninth frame F9. Thus, the ninth frame F9 may represent a luminance higher than a desired luminance or a predetermined luminance so that the higher luminance may be shown to a user as an image sticking or remaining.

In FIG. 5C, the response speed of the power voltage ELVDD may vary according to an increase and a decrease of the luminance. For example, when the luminance of the present frame of the input image data IMG is equal to or less than the luminance of the previous frame of the input image data IMG, the power voltage ELVDD has the first response speed. When the luminance of the present frame of the input image data IMG is greater than the luminance of the previous frame of the input image data IMG, the power voltage ELVDD has the second response speed slower than the first response speed. In FIG. 5C, the input image data IMG represents the low grayscale image BLACK in first to fourth frames F1 to F4, the high grayscale image WHITE in fifth to eighth frames F5 to F8 and the low grayscale image BLACK in ninth to thirteenth frames F9 to F12.

When the net power control operation is not fast enough, the fifth frame F5 may represent a first data voltage to which the net power control operation is not applied. However, the response speed of the power voltage ELVDD is set to be slow in FIG. 5C so that the luminance of the display panel 100 does not boost highly in the initial portion of the fifth frame F5. For example, at the fifth frame F5, the response speed may be set to the second response speed.

In addition, since the response speed of the power voltage ELVDD is set to be fast (the first response speed), the luminance is quickly reduced in an initial portion of the ninth frame F9. For example, at the ninth frame F9, the response speed may be set to the first response speed. Thus, an image defect such as the image sticking or remaining may not be generated in the ninth frame F9.

According to the present exemplary embodiment, the input image data IMG may be analyzed and the response speed of the power voltage ELVDD applied to the pixel may be adjusted according to the input image data IMG. When the luminance of the present frame of the input image data IMG is equal to or less than the luminance of the previous frame of the input image data IMG, the response speed of the power voltage ELVDD may be adjusted to increase and be relatively high. When the luminance of the present frame of the input image data IMG is greater than the luminance of the previous frame of the input image data IMG, the response speed of the power voltage ELVDD may be adjusted to decrease and be relatively low; for example, lower than the first response speed. Thus, when the luminance of the present frame is greater than the luminance of the previous frame, the flicker of the display panel 100 may be prevented. In addition, when the luminance of the present frame is less than the luminance of the previous frame, the high response speed of the power voltage may be maintained. Thus, the display quality of the display panel 100 may be increased.

Figure 6:
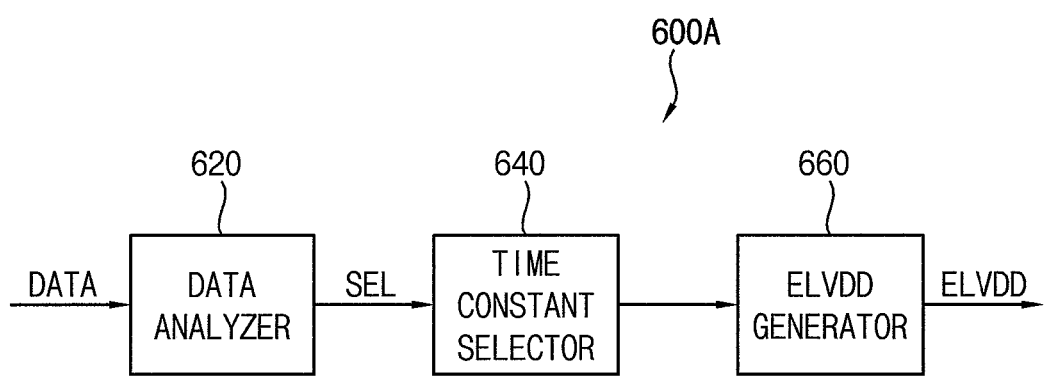
FIG. 6 is a block diagram illustrating a power voltage generator of a display apparatus according to an exemplary embodiment of the present inventive concept.

FIG. 6 is a block diagram illustrating a power voltage generator 600A of a display apparatus according to an exemplary embodiment of the present inventive concept.

The display apparatus and the method of driving the display panel according to the present exemplary embodiment is substantially the same as the display apparatus and the method of driving the display panel of the previous exemplary embodiment explained referring to FIGS. 1 to 5C except that the data analyzer and the time constant selector are disposed in the power voltage generator. Thus, the same reference numerals may be used to refer to the same or like parts as those described in the previous exemplary embodiment of FIGS. 1 to 5C and any repetitive explanation concerning the above elements may be omitted.

Referring to FIGS. 1, 2 and 4 to 6, the display apparatus includes a display panel 100 and a display panel driver. The display panel driver includes a driving controller 200, a gate driver 300, a gamma reference voltage generator 400, a data driver 500 and a power voltage generator 600A.

The power voltage generator 600A may generate the power voltage ELVDD having a response speed varied according to the input image data IMG. When a luminance of a present frame of the input image data IMG is equal to or less than a luminance of a previous frame of the input image data IMG, the power voltage ELVDD may have a first response speed. When the luminance of the present frame of the input image data IMG is greater than the luminance of the previous frame of the input image data IMG, the power voltage ELVDD may have a second response speed different from the first response speed. For example, the second response speed may be slower than the first response speed.

In the present exemplary embodiment, the power voltage generator 600A may include a data analyzer 620, a time constant selector 640 and an ELVDD generator 660.

The data analyzer 620 analyzes the input image data IMG. The data analyzer 220 may determine whether the luminance of the present frame of the input image data IMG is greater than the luminance of the previous frame of the input image data IMG. The data analyzer 620 may generate a selecting signal SEL representing that the luminance of the present frame of the input image data IMG is greater than the luminance of the previous frame of the input image data IMG.

In the present exemplary embodiment, the data analyzer 620 may receive the data signal DATA from the driving controller 200. The data analyzer 620 may analyze the data signal DATA corresponding to the input image data IMG to determine whether the luminance of the present frame of the input image data IMG is greater than the luminance of the previous frame of the input image data IMG.

The data analyzer 620 may determine the luminance of the present frame of the input image data IMG as a total sum of grayscale data of the present frame of the input image data IMG corresponding to an entire area of the display panel 100.

The data analyzer 620 may determine the luminance of the previous frame of the input image data IMG as a total sum of grayscale data of the previous frame of the input image data IMG corresponding to an entire area of the display panel 100.

The time constant selector 640 may determine the time constant of the power voltage ELVDD in response to the selecting signal SEL.

In the present exemplary embodiment, the time constant selector 640 may include two time constant circuits. For example, the time constant selector 640 may include a first switch SW1, a first time constant circuit connected to the first switch SW1, a second switch SW2 and a second time constant circuit connected to the second switch SW2.

The ELVDD generator 660 may be connected to the first time constant circuit through the first switch SW1 or the second time constant circuit through the second switch SW2.

The time constant of the second time constant circuit may be greater than the time constant of the first time constant circuit. Thus, when the ELVDD generator 660 is connected to the second time constant circuit through the second switch SW2, the response speed of the power voltage ELVDD may be slow. When the ELVDD generator 660 is connected to the first time constant circuit through the first switch SW1, the response speed of the power voltage ELVDD may get faster. For example, the response speed of the power voltage ELVDD corresponding to the first time constant circuit may be faster than the response speed of the power voltage ELVDD corresponding to the second time constant circuit.

According to the present exemplary embodiment, the input image data IMG may be analyzed and the response speed of the power voltage ELVDD applied to the pixel may be adjusted according to the input image data IMG. When the luminance of the present frame of the input image data IMG is equal to or less than the luminance of the previous frame of the input image data IMG, the response speed of the power voltage ELVDD may be adjusted to increase. For example, the response speed of the power voltage ELVDD may be relatively high. When the luminance of the present frame of the input image data IMG is greater than the luminance of the previous frame of the input image data IMG, the response speed of the power voltage ELVDD may be adjusted to decrease. For example, the response speed of the power voltage ELVDD may be relatively low. Thus, when the luminance of the present frame increases to be greater than the luminance of the previous frame, the flicker may be prevented. In addition, when the luminance of the present frame does not increase to be greater than the luminance of the previous frame, the high response speed of the power voltage may be maintained. Thus, the display quality of the display panel 100 may be increased.

Figure 7:
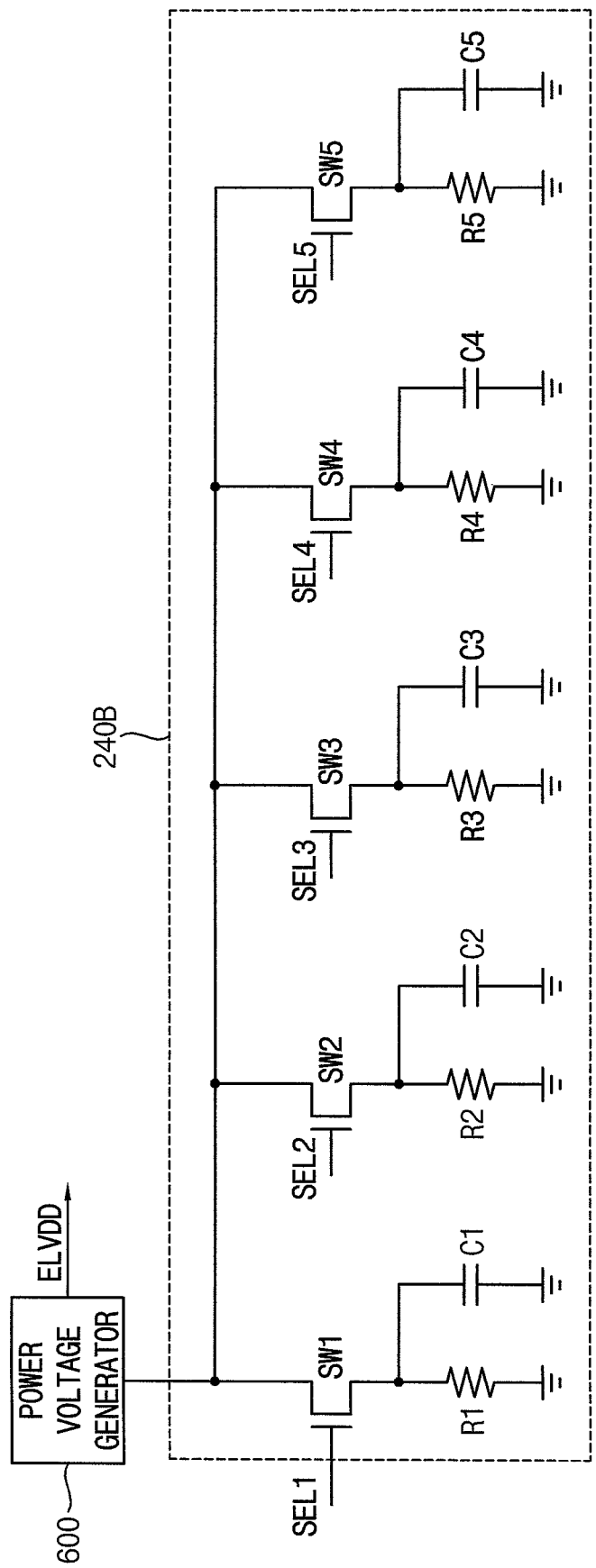
FIG. 7 is a circuit diagram illustrating a time constant selector according to an exemplary embodiment of the present inventive concept.

FIG. 7 is a circuit diagram illustrating a time constant selector 240B according to an exemplary embodiment of the present inventive concept. FIG. 8 is a table illustrating an operation of the time constant selector 240B of FIG. 7.

The display apparatus and the method of driving the display panel according to the present exemplary embodiment is substantially the same as the display apparatus and the method of driving the display panel of the previous exemplary embodiment explained referring to FIGS. 1 to 5C except for the structure and the operation of the time constant selector. Thus, the same reference numerals may be used to refer to the same or like parts as those described in the previous exemplary embodiment of FIGS. 1 to 5C and any repetitive explanation concerning the above elements may be omitted.

Referring to FIGS. 1 to 3, 5A to 5C, 7 and 8, the display apparatus includes a display panel 100 and a display panel driver. The display panel driver includes a driving controller 200, a gate driver 300, a gamma reference voltage generator 400, a data driver 500 and a power voltage generator 600.

The power voltage generator 600 may generate the power voltage ELVDD having a response speed that varies according to the input image data IMG. When a luminance of a present frame of the input image data IMG is equal to or less than a luminance of a previous frame of the input image data IMG, the power voltage ELVDD may have a first response speed. When the luminance of the present frame of the input image data IMG is greater than the luminance of the previous frame of the input image data IMG, the power voltage ELVDD may have a second response speed different from the first response speed. For example, the second response speed may be slower than the first response speed. In the present exemplary embodiment, when the luminance of the present frame of the input image data IMG is greater than the luminance of the previous frame of the input image data IMG, the response speed of the power voltage ELVDD may vary according to the difference between the luminance of the previous frame of the input image data IMG and the luminance of the present frame of the input image data IMG.

In the present exemplary embodiment, the driving controller 200 may include the data analyzer 220 and the time constant selector 240B. In addition, the power voltage generator 600 may include the data analyzer 620 and the time constant selector 640 as shown in FIG. 6.

The data analyzer 220 analyzes the input image data IMG. The data analyzer 220 may determine whether the luminance of the present frame of the input image data IMG is greater than the luminance of the previous frame of the input image data IMG. The data analyzer 220 may generate a selecting signal SEL representing that the luminance of the present frame of the input image data IMG is greater than the luminance of the previous frame of the input image data IMG.

The time constant selector 240B may determine the time constant of the power voltage ELVDD in response to the selecting signal SEL.

In the present exemplary embodiment, the time constant selector 240B may include five time constant circuits; however, the present inventive concept is not limited thereto and may include less than five time constant circuits or more than five time constant circuits. When the luminance of the present frame of the input image data IMG is equal to or less than the luminance of the previous frame of the input image data IMG, a first time constant circuit may be connected to the power voltage generator 600 through the first switch SW1. When the luminance of the present frame of the input image data IMG is greater than the luminance of the previous frame of the input image data IMG, one of time constant circuits except for the first time constant circuit may be connected to the power voltage generator 600 through their respective switch (e.g., SW2-SW5) according to the difference of the luminance of the present frame of the input image data IMG and the luminance of the previous frame of the input image data IMG.

Although the time constant selector 240B includes five time constant circuits, the present inventive concept is not limited thereto.

For example, the time constant selector 240B may include a first switch SW1 to which the selecting signal SEL may be applied to, a first time constant circuit connected to the first switch SW1, a second switch SW2 to which the selecting signal SEL may be applied to, a second time constant circuit connected to the second switch SW2, a third switch SW3 to which the selecting signal SEL may be applied to, a third time constant circuit connected to the third switch SW3, a fourth switch SW4 to which the selecting signal SEL may be applied to, a fourth time constant circuit connected to the fourth switch SW4, a fifth switch SW5 to which the selecting signal SEL may be applied to and a fifth time constant circuit connected to the fifth switch SW5.

For example, a first selecting signal SEL1 may be applied to the first switch SW1, a second selecting signal SEL2 may be applied to the second switch SW2, a third selecting signal SEL3 may be applied to the third switch SW3, a fourth selecting signal SEL4 may be applied to the fourth switch SW4 and a fifth selecting signal SEL5 may be applied to the fifth switch SW5.

For example, when the luminance of the present frame of the input image data IMG is equal to or less than the luminance of the previous frame of the input image data IMG, the data analyzer 220 may activate and output the first selecting signal SEL1 and deactivate the second to fifth selecting signals SEL2 to SEL5. Thus, when the luminance of the present frame of the input image data IMG is equal to or less than the luminance of the previous frame of the input image data IMG, the first switch SW is turned on so that the power voltage generator 600 is connected to the first time constant circuit through the first switch SW1 and the power voltage ELVDD may have the first response speed.

For example, when the luminance of the present frame of the input image data IMG is greater than the luminance of the previous frame of the input image data IMG, the data analyzer 220 may activate and output one of the second to fifth selecting signals SEL2 to SEL5 according to the difference of the luminance of the present frame of the input image data IMG and the luminance of the previous frame of the input image data IMG.

Thus, when the luminance of the present frame of the input image data IMG is greater than the luminance of the previous frame of the input image data IMG, one of the second to fifth switches SW2 to SW5 is turned on so that the power voltage ELVDD may have one of the second to fifth response speeds, each corresponding to their respective time constant circuit.

For example, the first time constant circuit may include a first resistor R1 connected to the first switch SW1 and a first capacitor C1 connected to the first resistor R1 in parallel. For example, the second time constant circuit may include a second resistor R2 connected to the second switch SW2 and a second capacitor C2 connected to the second resistor R2 in parallel. For example, the third time constant circuit may include a third resistor R3 connected to the third switch SW3 and a third capacitor C3 connected to the third resistor R3 in parallel. For example, the fourth time constant circuit may include a fourth resistor R4 connected to the fourth switch SW4 and a fourth capacitor C4 connected to the fourth resistor R4 in parallel. For example, the fifth time constant circuit may include a fifth resistor R5 connected to the fifth switch SW5 and a fifth capacitor C5 connected to the fifth resistor R5 in parallel.

The time constant of the first time constant circuit may be determined as a multiplication of a resistance of the first resistor R1 and a capacitance of the first capacitor C1. The time constant of the second time constant circuit may be determined as a multiplication of a resistance of the second resistor R2 and a capacitance of the second capacitor C2.

The time constant of the third time constant circuit may be determined as a multiplication of a resistance of the third resistor R3 and a capacitance of the third capacitor C3. The time constant of the fourth time constant circuit may be determined as a multiplication of a resistance of the fourth resistor R4 and a capacitance of the fourth capacitor C4. The time constant of the fifth time constant circuit may be determined as a multiplication of a resistance of the fifth resistor R5 and a capacitance of the fifth capacitor C5.

The time constant of the second time constant circuit may be greater than the time constant of the first time constant circuit. Thus, when the power voltage generator 600 is connected to the second time constant circuit through the second switch SW2, the response speed of the power voltage ELVDD may be slower than the response speed of the power voltage ELVDD generated when the power voltage generator 600 is connected to the first time constant circuit through the first switch SW1.

The time constant of the third time constant circuit may be greater than the time constant of the second time constant circuit. Thus, when the power voltage generator 600 is connected to the third time constant circuit through the third switch SW3, the response speed of the power voltage ELVDD may be slower than the response speed of the power voltage ELVDD generated when the power voltage generator 600 is connected to the second time constant circuit through the second switch SW2.

The time constant of the fourth time constant circuit may be greater than the time constant of the third time constant circuit. Thus, when the power voltage generator 600 is connected to the fourth time constant circuit through the fourth switch SW4, the response speed of the power voltage ELVDD may be slower than the response speed of the power voltage ELVDD generated when the power voltage generator 600 is connected to the third time constant circuit through the third switch SW3.

The time constant of the fifth time constant circuit may be greater than the time constant of the fourth time constant circuit. Thus, when the power voltage generator 600 is connected to the fifth time constant circuit through the fifth switch SW5, the response speed of the power voltage ELVDD may be slower than the response speed of the power voltage ELVDD generated when the power voltage generator 600 is connected to the fourth time constant circuit through the fourth switch SW4.

For example, in FIG. 8, when the luminance of the previous frame is 0% and the luminance of the present frame is 25%, the power voltage generator 600 may be connected to the second time constant circuit. When the luminance of the previous frame is 0% and the luminance of the present frame is 50%, the power voltage generator 600 may be connected to the third time constant circuit. When the luminance of the previous frame is 0% and the luminance of the present frame is 75%, the power voltage generator 600 may be connected to the fourth time constant circuit. When the luminance of the previous frame is 0% and the luminance of the present frame is 100%, the power voltage generator 600 may be connected to the fifth time constant circuit.

For example, the selective connection between the power voltage generator 600 and the second to fifth time constant circuits may be determined by threshold values of the difference between the luminance of the previous frame and the luminance of the present frame. For example, the selective connection between the power voltage generator 600 and one of the second to fifth time constant circuits may be determined by whether or not the difference between the luminance of the previous frame and the luminance of the present frame is equal or less than a threshold value.

According to the present exemplary embodiment, the input image data IMG may be analyzed and the response speed of the power voltage ELVDD applied to the pixel may be adjusted according to the input image data IMG. When the luminance of the present frame of the input image data IMG is equal to or less than the luminance of the previous frame of the input image data IMG, the response speed of the power voltage ELVDD may be adjusted to increase and be relatively high. When the luminance of the present frame of the input image data IMG is greater than the luminance of the previous frame of the input image data IMG, the response speed of the power voltage ELVDD may be adjusted to decrease and be relatively low. Thus, when the luminance of the present frame increases to be greater than the luminance of the previous frame, the flickering of the display panel may be prevented. In addition, when the luminance of the present frame does not increase to be greater than the luminance of the previous frame, the high response speed of the power voltage may be maintained. Thus, the display quality of the display panel 100 may be increased.

According to an exemplary embodiment of the present inventive concept, the display apparatus and the method of driving the display panel using the display apparatus may adjust the response speed of the power voltage applied to the pixel according to the input image data so that the display quality of the display panel 100 may be increased.

The foregoing is illustrative of the present inventive concept and is not to be construed as limiting thereof. Although a few exemplary embodiments of the present inventive concept have been described, those of ordinary skill in the art will readily understand that various modifications in form and detail are possible in the exemplary embodiments without departing from the spirit and scope of the present inventive concept. Accordingly, all such modifications are intended to be included within the spirit and scope of the present inventive concept.

What is claimed is:

1. A display apparatus, comprising:
   a display panel configured to display an image based on input image data;
   a gate driver configured to output a gate signal to the display panel;
   a data driver configured to output a data voltage to the display panel; and
   a power voltage generator configured to generate a power voltage and output the power voltage to cause an image to display on the display panel, wherein the power voltage has a response speed that varies according to the input image data, wherein the response speed of the power voltage varies between a first response speed and a second response speed based on a luminance of a present frame of the input image data and a luminance of a previous frame of the input image data, wherein the second response speed is different from the first response speed.

2. The display apparatus of claim 1, wherein the power voltage has the first response speed when the luminance of the present frame of the input image data is equal to or less than the luminance of the previous frame of the input image data,
   wherein the power voltage has the second response speed when the luminance of the present frame of the input image data is greater than the luminance of the previous frame of the input image data.

3. The display apparatus of claim 2, wherein the second response speed is slower than the first response speed.

4. The display apparatus of claim 2, wherein the luminance of the present frame of the input image data is determined as a total sum of grayscale data of the present frame of the input image data corresponding to an entire area of the display panel, and
wherein the luminance of the previous frame of the input image data is determined as a total sum of grayscale data of the previous frame of the input image data corresponding to the entire area of the display panel.

5. The display apparatus of claim 2, further comprising:
a data analyzer configured to analyze the input image data, determine whether the luminance of the present frame of the input image data is greater than the luminance of the previous frame of the input image data and generate a selecting signal representing whether the luminance of the present frame of the input image data is greater than the luminance of the previous frame of the input image data; and
a time constant selector configured to determine a time constant of the power voltage in response to the selecting signal.

6. The display apparatus of claim 5, further comprising a driving controller configured to control an operation the gate driver and an operation of the data driver,
wherein the driving controller comprises the data analyzer and the time constant selector.

7. The display apparatus of claim 5, wherein the power voltage generator comprises the data analyzer and the time constant selector.

8. The display apparatus of claim 5, wherein the time constant selector comprises:
a first switch configured to receive the selecting signal from the data analyzer;
a first time constant circuit connected to the first switch;
a second switch configured to receive the selecting signal from the data analyzer; and
a second time constant circuit connected to the second switch.

9. The display apparatus of claim 8, wherein the first time constant circuit comprises a first resistor connected to the first switch and a first capacitor connected to the first resistor in parallel, and
wherein the second time constant circuit comprises a second resistor connected to the second switch and a second capacitor connected to the second resistor in parallel.

10. The display apparatus of claim 9, wherein the first switch is turned on and the power voltage generator is connected to the first time constant circuit through the first switch when the luminance of the present frame of the input image data is equal to or less than the luminance of the previous frame of the input image data,
wherein the second switch is turned on and the power voltage generator is connected to the second time constant circuit through the second switch when the luminance of the present frame of the input image data is greater than the luminance of the previous frame of the input image data, and
wherein a multiplication of a resistance of the second resistor and a capacitance of the second capacitor is greater than a multiplication of a resistance of the first resistor and a capacitance of the first capacitor.

11. The display app rants of claim 5, wherein the time constant selector comprises:
a first switch configured to receive the selecting signal from the data analyzer;
a first time constant circuit connected to the first switch;
a second switch configured to receive the selecting signal from the data analyzer;
a second time constant circuit connected to the second switch;
a third switch configured to receive the selecting signal from the data analyzer; and
a third time constant circuit connected to the third switch.

12. The display apparatus of claim 11, wherein the first switch is turned on and the power voltage generator is connected to the first time constant circuit through the first switch when the luminance of the present frame of the input image data is equal to or less than the luminance of the previous frame of the input image data,
wherein the second switch is turned on and the power voltage generator is connected to the second time constant circuit through the second switch when the luminance of the present frame of the input image data is greater than the luminance of the previous frame of the input image data and when a difference between the luminance of the present frame of the input image data and the luminance of the previous frame of the input image data is equal to or less than a threshold value, and
wherein the third switch is turned on and the power voltage generator is connected to the third time constant circuit through the third switch when the luminance of the present frame of the input image data is greater than the luminance of the previous frame of the input image data and when the difference between the luminance of the present frame of the input image data and the luminance of the previous frame of the input image data is greater than the threshold value.

13. The display apparatus of claim 1, wherein the display panel comprises an organic light emitting diode, and
wherein the power voltage is output to the organic light emitting diode.

14. A method of driving a display panel, the method comprising:
outputting a gate signal to the display panel;
outputting a data voltage corresponding to input image data to the display panel;
generating a power voltage having a response speed that varies according to the input image data; and
outputting the power voltage to a pixel of the display panel,
wherein the power voltage has a first response speed when a luminance of a present frame of the input image data is equal to or less than a luminance of a previous frame of the input image data,
wherein the power voltage has a second response speed when the luminance of the present frame of the input image data is greater than the luminance of the previous frame of the input image data, and
wherein the second response speed is different from the first response speed.

15. The method of claim 14, wherein the second response speed is slower than the first response speed.

16. The method of claim 14, wherein the luminance of the present frame of the input image data is determined as a total sum of grayscale data of the present frame of the input image data corresponding to an entire area of the display panel, and
wherein the luminance of the previous frame of the input image data is determined as a total sum of grayscale data of the previous frame of the input image data corresponding to the entire area of the display panel.

17. The method, of claim 14, further comprising:
analyzing the input image data, determining whether the luminance of the present frame of the input image data is greater than the luminance of the previous frame of the input image data and generating a selecting signal representing whether the luminance of the present frame of the input image data is greater than the luminance of the previous frame of the input imager data, using a data analyzer; and determining a time constant, of the power voltage in response to the selecting signal, using a time constant selector.

18. The method of claim 17, wherein the time constant selector comprises:
a first switch configured to receive the selecting signal from the data analyzer;
a first time constant circuit connected to the first switch;
a second switch configured to receive the selecting signal from the data analyzer; and
a second time constant circuit connected to the second switch.

19. The method of claim 18, wherein the first time constant circuit comprises a first resistor connected to the first switch and a first capacitor connected to the first resistor in parallel, and
wherein the second time constant circuit comprises a second resistor connected to the second switch and a second capacitor connected to the second resistor in parallel.

\* \* \* \* \*